United States Patent Office 3,077,698
Patented Feb. 19, 1963

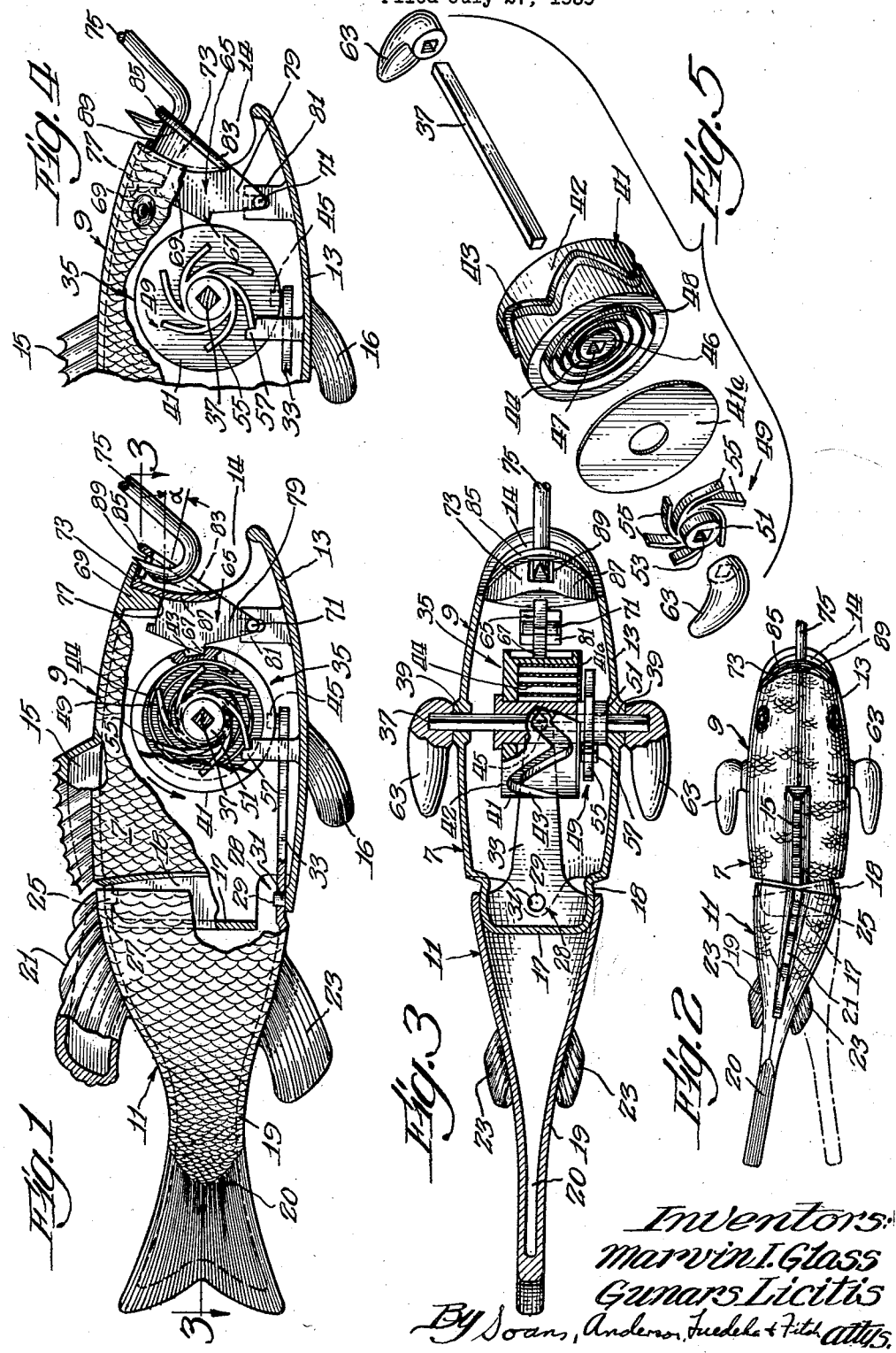

3,077,698
TOY FISH
Marvin I. Glass and Gunars Licitis, Chicago, Ill.; said
Gunars Licitis assignor to Marvin I. Glass
Filed July 27, 1959, Ser. No. 829,615
2 Claims. (Cl. 46—92)

The present invention relates generally to a toy fish adapted for use in a fishing game and, more particularly, it relates to a toy fish of the class described which is adapted to fight when it is hooked during the game.

Various childrens' games have been designed which involve hooking a simulated fish which is disposed under the surface of water in a pan or other container. These games have involved skill in that the connection between the hook and the ring or other connector on the fish can be made quite difficult to effect and the refraction of light caused by the water makes it difficult to judge exact distances under water. However, in most games of this type, the participants quickly lose interest in the game because there is little action.

Accordingly, it is an object of this invention to provide a fishing game which supplies the element of action to the game in that the fish fights after it is hooked. A further object of the invention is to provide a mechanical fish which is useable in a game of the class described.

Other objects and advantages of the invention will become known by reference to the appended drawings, and the following description of one preferred embodiment thereof.

In the drawings:
FIGURE 1 is an elevational view partially in section of a fish embodying various of the features of the invention;
FIGURE 2 is a plan view of the fish shown in FIGURE 1;
FIGURE 3 is a sectional view taken along line 3—3 in FIGURE 1;
FIGURE 4 is a sectional view of the head portion of the fish shown in FIGURE 1 showing the action involved when the hook is fully engaged to cause the fish to fight; and
FIGURE 5 is an exploded view showing the driving mechanism for the fish.

In general, a fish embodying the features of the invention includes an articulated body having flotation chambers in the upper portion of the body so that the fish will float in an upright position. Means are provided within the fish body to cause the articulated sections of the body to hinge rapidly relative to one another so as to cause a fighting action. The body of the fish also includes control means engageable by a hook or the like to cause the fish to commence its fighting action.

In the illustrated structure, the fish includes a body 7 which is formed in two articulated sections 9 and 11. The forward or head section is formed from a shell 13 of plastic or the like shaped to simulate the head section of a fish. In the illustrated structure the shell 13 is provided with an opening 14 at its forward end which simulates a mouth, a rounded dome-shaped upper section which may include a vertically disposed, hollow upper fin 15 and a vertically disposed lower fin 16, as illustrated, and a rearward bulkhead section 17 which extends downwardly across the upper portion of the head section 9. The rearward end of the head section 9 is tapered somewhat, as is illustrated at 18 in FIGURE 2, so as to provide a mating engagement with the tail section 11 which will be described.

The tail or rearward body section 11 is also formed from a plastic shell 19 or the like, and includes a hollow tail 20, a hollow, vertically disposed upper fin 21, and a vertically disposed, downwardly directed lower fin 23. The lower fin 23 may be separated longitudinally into a pair of spaced apart members in order to provide in cooperation with its lower fin 16 a tripod base for the fish to rest upon when the fish is out of the water. In the illustrated structure the tail 20 is hollow, as is the upper fin 21 so as to form pockets in the upper section thereof in which air may be entrapped to buoy up the fish. The forward end of the tail section 11 is proportioned so as to extend over the tapered section 18 of the head body section 9.

The articulated connection is effected by providing a downwardly directed boss or pin 25 at the forward end of the upper portion of the tail section 11. The pin 25 is adapted to be engaged in a hole 27 provided in the tapered portion 18 at the rearward end of the head section 9. A hinge connection 28 is also provided at the lower portion of the body by providing an upwardly directed boss 29 in the rearward portion of the forward body section, the boss 29 engaging a hole 31 in the forward edge of the tail section 11. As illustrated in the drawings (FIGURE 1), a portion 33 of the rearward body section extends forwardly to provide a tongue for engaging the driving mechanism for the device.

The motive power for the articulated motion is effected by a spring powdered cam unit 35 which is actuated by control means, which will hereinafter be described, to cause the fish to thrash and fight. The unit 35 is supported within the body of the fish upon a transversely extending, horizontally disposed shaft 37 which is journalled in openings 39 in the side walls of the fish body (FIGURES 3 and 5). The shaft is of irregular cross section, in the illustrated embodiment square, so as to provide a driving connection between the various drive elements, as will hereinafter be described.

Movement of the tail section 11 of the fish is accomplished by a hollow, drum shaped cam 41 which is rotatably supported upon the shaft 37 and which is provided in its outer face 42 with a sinuous cam track 43. The cam track 43 is adapted to be engaged by a cam follower 45 which is attached to the forward end of the forwardly extending tongue 33. It will be seen that when the cam 41 rotates that the cam follower 45 will cause the lever 33 to move from side to side thereby causing the tail section 11 of the fish to hinge back and forth relative to the head section 9 of the fish.

Power for the cam 41 is provided by a coil spring 44 of the clock spring type which is supported within the hollow cam 41. The cam 41 is provided with a flanged side wall 41a in order to permit the spring 44 to be disposed within the cam 41, the side wall 41a being suitably attached to the cam 41 after assembly. The spring 44 acts upon the cam 41 through a uni-directional drive. In this connection, the inner end of the spring 44 is attached to a bushing 46 which is supported on the cross shaft 37 for rotation therewith. In this connection, the aperture 47 in the bushing is provided with a cross section which engages the irregular cross section of the shaft 37. The outer end of the spring 44 is provided with a connecting tab 48 which is anchored to the cam 41.

Driving engagement between the shaft 37 and the cam 41 is effected by a ratchet 49 which is fabricated from flexible material, such as plastic or the like (FIGURE 5). The ratchet includes a central portion or hub 51 having a passageway 53 shaped to engage the ratchet to the shaft 37 for rotation therewith, and a plurality of elongated arcuate dogs 55 which extend generally tangentially from and are spaced along the periphery of the hub 51. The ratchet is adapted to fit on the shaft 37 adjacent one of the faces of the cam 41, with the flexible dogs 55 being adapted to engage a projection or tooth 57 attached to the head section 9 of the fish. The ratchet dogs 55 are adapted to slip over the projection or tooth 57 when they are rotated in the counterclockwise direction in FIGURE 1, but are adapted to engage the tooth 57 when they are rotated in the opposite direction.

The winding handle for the spring motor is provided by simulated fins 63 on the sides of the head section 9, the fins 63 being rigidly attached to the outer ends of the shaft 37 which extends through the wall of the head section 9 (FIGURE 3).

The control means for starting and stopping the unit comprises a hinged detent 65 which is adapted to be engaged in the cam track 43 of the cam 41. The detent 65 includes a detent tooth 67 which is adapted to directly engage the cam track 43, a wedging block 69, a pivot pin 71, and a section 73 which is adapted to extend from the block 69 to a point adjacent the mouth of the fish for engagement by a hook 75.

As shown in FIGURE 1, the detent tooth 67 extends rearwardly from the wedging block 69 and is proportioned to engage the central portion of the cam track 43. The upper surface of the wedging block 69 fits against an abutment 77 which is generally horizontally disposed and which is formed as a part of the body section. As shown in FIGURE 1, the abutment 77 slopes at a slight angle α (FIGURE 1), e.g. 10° from the horizontal, so as to aid in obtaining the desired wedging action. The lower end of the wedging block 69 includes a downwardly extending web 79 which supports the horizontally disposed, transversely extending pivot 71. The pivot pin 71 is slidably engaged in a pair of bifurcated members 81 so that the detent 65 is enabled to move vertically and pivot about the pivot pin 71.

FIGURE 1 shows the detent 65 in the locking position. In this position the action of the spring biased cam 41 acts upwardly upon the detent tooth 67 and causes the wedging block 69 to be wedged against the abutment 77. This effectively prevents rotation of the cam 41. Also, the force of the spring 44 which acts in a counterclockwise direction in FIGURE 1 on the tooth 67 forces the block 69 against the abutment 77 insuring locking relationship. In this position, the hook engaging section 73 extends upwardly to a point adjacent the upper portion of the mouth opening 14 of the fish. The forward surface of the hook engaging section 73 provides a transversely extending wall 83 which slopes upwardly and forwardly from the wedging block 69. The upper end of the wall 83 is provided with a head 85 which is adapted to simulate the upper lip of the fish. Extending rearwardly from the head 85 there is provided a hood 87 which slides into and out of the mouth opening 14 so that movement of the head 85 makes it appear that the fish is closing his mouth. A small space is provided between the head 85 and the forward edge of the opening 14, and a portion of the hook 87 is cut out to provide an access opening 89 for the hook as shown at 89 in FIGURES 1, 3 and 4. The access opening 89 permits a hook to move between the head or lip 85 and the forward edge of the shell 13 to rock the wedging block 67 about the pivot 71.

In operation, the spring 44 is wound by turning the fins 63, the detent tooth 67 being in position to prevent movement of the cam 41. In this condition, as the spring 44 is tensioned the ratchet dogs 55 slide readily over the tooth 57, the cam remaining stationary. The toy is then placed in water and air is trapped in the upper portion of the tail section 20 and in the upper portions of the fin 21 and the forward body section and fin 15 so as to buoy up the fish. The hook 75 is then dangled on the end of a line (not shown) in front of the fish. The hook should desirably terminate in an upwardly directed, rather broad wedge shape, as illustrated (FIGURES 1 and 4), so as to most effectively operate the device. When the hook 75 is raised upwardly in the opening 89 between the lip head 85 and the body shell 13, the wedge action of the hook 75 moves the hook engaging section 73 forwardly which, in turn, tilts the wedge block 69 about the pivot pin 71. Because of the arrangement of the wedge block 69 and the pivot pin 71, a slight forward movement of the hook engaging section 73 causes substantial angular movement of the detent tooth 67 since the pivot pin 71 moves downwardly in the bifurcated members 81 changing the center of rotation. Further, the upward force caused by the action of the spring 44 on the cam 41 throws the detent tooth 67 out of the cam track 43. This causes the cam 41 to rotate under the action of the spring 44 which, in turn, causes the rearward body section to rapidly hinge back and forth relative to the forward body section 9, causing the fish to thrash. Often, the fighting is violent enough to disengage the hook from the opening 89 thereby permitting the fish to "escape."

The various features of the invention cooperate to provide an amusing and fascinating toy. When the fish is properly hooked, it fights and may escape before one is able to remove the fish from the water. The fighting action is enhanced by the air chambers in the upper portion of the fish.

Various features of the invention believed to be new are set forth in the appended claims.

We claim:

1. A fish toy of the class described comprising an articulated body including a forward section and a tail section, means for hingedly connecting said sections for hinged action along a vertical axis, power means interconnecting said forward and tail sections for causing said sections to hinge back and forth relative to one another, said power means including a cam for providing oscillating movement of one of said sections relative to the other, and a releasable lock for said power means including a detent engageable with said cam, a member adapted to be engaged by a hook and means for connecting said hook engaging member with said detent whereby said hook may be employed to release said detent.

2. A fish toy of the class described comprising an articulated body including a forward section and a tail section, said forward section including an opening simulating a mouth for said fish, a member simulating a lip of said mouth, means for movably supporting said lip member in said mouth opening, means for hingedly connecting said sections for hinged action along a vertical axis, one of said sections being provided with an extension which extends into the interior of the other of said sections, power means within said other section for engaging said extension, said power means including a cam for providing oscillating movement of said extension so as to cause said sections to hinge back and forth relative to one another, and a releasable lock for said power means including a detent engageable with said cam, said detent being connected to said lip member, whereby engagement of a hook with said lip member moves said lip member to release said detent, thereby energizing said power means and causing thrashing of said fish.

References Cited in the file of this patent

UNITED STATES PATENTS

| | | |
|---|---|---|
| 1,332,545 | De Filippis | Mar. 2, 1920 |
| 1,471,147 | Dienner | Oct. 16, 1923 |
| 1,643,903 | Prosser | Sept. 27, 1927 |
| 1,661,758 | King | Mar. 6, 1928 |
| 2,003,193 | Hirose | May 28, 1935 |
| 2,242,724 | Kniesner | May 20, 1941 |
| 2,329,564 | Thomas | Sept. 14, 1943 |
| 2,343,002 | Colaluca | Feb. 29, 1944 |
| 2,511,430 | Colaluca | June 13, 1950 |
| 2,909,868 | Lewis | Oct. 27, 1959 |